United States Patent
Shukla et al.

(10) Patent No.: US 11,348,160 B1
(45) Date of Patent: May 31, 2022

(54) DETERMINING ORDER PREFERENCES AND ITEM SUGGESTIONS

(71) Applicant: ConverseNowAI, Austin, TX (US)

(72) Inventors: Vinay Kumar Shukla, Austin, TX (US); Rahul Aggarwal, Austin, TX (US); Pranav Nirmal Mehra, Bangalore (IN); Vrajesh Navinchandra Sejpal, Bangalore (IN); Akshay Labh Kayastha, Bangalore (IN); Yuganeshan A J, Bangalore (IN)

(73) Assignee: ConverseNowAI, Austin, TX (US)

( * ) Notice: Subject to any disclaimer, the term of this patent is extended or adjusted under 35 U.S.C. 154(b) by 0 days.

(21) Appl. No.: 17/491,534

(22) Filed: Oct. 1, 2021

Related U.S. Application Data

(63) Continuation-in-part of application No. 17/184,207, filed on Feb. 24, 2021.

(51) Int. Cl.
  *G06Q 30/00* (2012.01)
  *G06Q 30/06* (2012.01)
  *G06N 20/00* (2019.01)
  *G10L 15/18* (2013.01)
  *G06K 9/62* (2022.01)
  *G06Q 30/02* (2012.01)

(52) U.S. Cl.
  CPC ....... *G06Q 30/0635* (2013.01); *G06K 9/6215* (2013.01); *G06N 20/00* (2019.01); *G06Q 30/0281* (2013.01); *G06Q 30/0631* (2013.01); *G10L 15/1815* (2013.01)

(58) Field of Classification Search
  CPC ........... G06Q 30/0635; G06Q 30/0281; G06Q 30/0631; G06N 20/00; G06K 9/6215; G10L 15/1815
  USPC .................................................... 705/26, 27
  See application file for complete search history.

(56) References Cited

U.S. PATENT DOCUMENTS

| | | |
|---|---|---|
| 5,357,596 A | 10/1994 | Takebayashi et al. |
| 5,625,749 A | 4/1997 | Goldenthal et al. |
| (Continued) | | |

OTHER PUBLICATIONS

Internet Archive Wayback Machine, conversnow.ai, Feb. 18, 2020, 2pgs. (Year: 2020).*

(Continued)

*Primary Examiner* — Robert M Pond
(74) *Attorney, Agent, or Firm* — Shiv S. Naimpally; Grable Martin Fulton PLLC

(57) ABSTRACT

A computer system may connect to various customer-facing devices and manage or automate the order process between a retail store and the customer. The computer system may perform the dialogue and receive an order for items from the retail store and may perform quality control monitoring of the dialogue between customers and employees taking orders. The ordering system may utilize the ordered items in combination with various contextual cues to determine a customer identity which may then be linked to past orders and/or various order preferences. Based on the determined customer identity, the system may provide recommendations of additional order items or order alterations to the customer before personally identifying information has been collected from the customer. The determination of the customer identity and the determination of recommendations may be performed by machine learning algorithms that were trained on customer data and the retail store products.

20 Claims, 9 Drawing Sheets

(56) References Cited

U.S. PATENT DOCUMENTS

| | | | |
|---|---|---|---|
| 6,330,539 | B1 | 12/2001 | Takayama et al. |
| 7,110,963 | B2 | 9/2006 | Negreiro |
| 9,129,289 | B2 | 9/2015 | Vaughn et al. |
| 9,626,703 | B2 | 4/2017 | Kennewick |
| 9,721,275 | B1* | 8/2017 | Grier .................. G06Q 30/0269 |
| 10,055,685 | B1 | 8/2018 | Arel et al. |
| 10,162,794 | B1 | 12/2018 | Arel et al. |
| 10,210,861 | B1 | 2/2019 | Arel et al. |
| 10,325,223 | B1 | 6/2019 | Arel et al. |
| 10,559,299 | B1 | 2/2020 | Arel et al. |
| 10,573,296 | B1 | 2/2020 | Arel et al. |
| 10,628,635 | B1 | 4/2020 | Carpenter et al. |
| 10,878,824 | B2 | 12/2020 | Carpenter et al. |
| 11,023,955 | B1* | 6/2021 | Carpenter, II ......... G06V 40/20 |
| 2002/0111881 | A1 | 8/2002 | Walker et al. |
| 2003/0144846 | A1 | 7/2003 | Denenberg et al. |
| 2006/0076397 | A1 | 4/2006 | Langos |
| 2007/0040026 | A1 | 2/2007 | Vleet et al. |
| 2011/0131038 | A1 | 6/2011 | Oyaizu et al. |
| 2011/0213655 | A1* | 9/2011 | Henkin .................. G06Q 30/00 707/E17.061 |
| 2014/0180817 | A1* | 6/2014 | Zilkha ............... G06F 16/24575 705/14.55 |
| 2016/0078504 | A1 | 3/2016 | Kennewick |
| 2017/0160813 | A1 | 6/2017 | Divakaran et al. |
| 2018/0308100 | A1 | 10/2018 | Haukioja et al. |
| 2019/0108566 | A1 | 4/2019 | Coleman et al. |
| 2019/0156122 | A1* | 5/2019 | Lu ........................ G06K 9/6215 |
| 2019/0163985 | A1* | 5/2019 | Wang ................ G06Q 30/0631 |
| 2019/0171711 | A1* | 6/2019 | Carpenter, II .......... G10L 15/26 |
| 2019/0251611 | A1 | 8/2019 | Coleman et al. |
| 2019/0266561 | A1 | 8/2019 | Koeppel et al. |
| 2019/0378533 | A1 | 12/2019 | Chao |
| 2020/0034848 | A1* | 1/2020 | Seo ........................ G06Q 20/20 |
| 2020/0160850 | A1 | 5/2020 | Lin et al. |
| 2020/0226667 | A1 | 7/2020 | Kalaimani |
| 2020/0273089 | A1* | 8/2020 | Siefken .................. G10L 25/30 |
| 2020/0279556 | A1 | 9/2020 | Gruber et al. |
| 2020/0311804 | A1 | 10/2020 | Buckholdt et al. |
| 2021/0158407 | A1 | 5/2021 | Mimassi |
| 2021/0233151 | A1* | 7/2021 | Rahman ............. G06Q 30/0629 |

OTHER PUBLICATIONS

"Just Buy It," Diakantonis, Demitri. Mergers and Acquisitions 54.10: 20-28. Middle Market Information LLC. (Nov./Dec. 2019); Dialog #2341682516 7pgs. (Year: 2019).*

McDonald's acquires Apprente, plans to speed up drive-thru lines with voice-based ordering technology, Kelly Tyko. USA Today (Online) [Arlington] Sep. 10, 2019, Dialog #2287454668 2pgs. (Year: 2019).*

"Kioskmarketplace.com—Networld Media Group: How self-service can make restaurants omnichannel retailers," Wheeler, Ben. Weblog post. Newstex Trade & Industry Blogs, Newstex. May 25, 2020, Dialgog #2406311887 3pgs. (Year: 2020).*

"Would You Like Fries With That?" Mcdonald's Acquires Tech to Help Boost Sales, Yaffe-Bellany, D Avid. National Post [Don Mills, Ont] Nov. 4, 2019: FP.3; Dialog #2311866379 3pgs. (Year: 2019).*

\* cited by examiner

DETERMINING ORDER PREFERENCES AND ITEM SUGGESTIONS

CROSS-REFERENCE TO RELATED APPLICATIONS

The present patent application is a continuation of U.S. patent application Ser. No. 17/184,207, filed on Feb. 24, 2021, entitled "DETERMINING ORDER PREFERENCES AND ITEM SUGGESTIONS" which is incorporated by reference herein in its entirety and for all purposes as if completely and fully set forth herein.

BACKGROUND OF THE INVENTION

Field of the Invention

This invention relates generally to computing devices and, more particularly to a system to process customer orders including determining order preferences and item suggestions.

Description of the Related Art

Quick service restaurants and other retail establishments have been left behind in the digital revolution. While some retailers may have developed a knowledge of their customers based on online orders and mobile apps, whereas food and beverage establishments know very little about their customers because of the interactions with their customers are typically brief and in-person. For example, a typical interaction may be an order shouted into a drive through microphone and an order received at a car window three minutes later. Thus, the quick service environment is not amenable to the typical technological solutions used at other goods and services retailers.

Customer knowledge improves marketing and product offerings. Information systems may also support employees to reduce fatigue, increase efficiency, and reduce order inaccuracy. Without usernames, addresses, loyalty memberships, and other identifiers, technology solutions designed for website retail and ecommerce are not able to provide insight into customers. Such improvement has been slow or haphazard in part due to the lack of customer information. Where mobile, phone, microphone, or in-person orders are commonplace, there is a need for technological solutions to bridge the gap between corporation and customer.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

As an example, a computer system may connect to various customer-facing devices and assist or automate the order process between a retail store and the customer. The computer system may perform the dialogue and receive the order for one or more items from the retail store and may perform quality control monitoring of the dialogue between customers and employees taking orders. The ordering system may utilize the ordered items in combination with various contextual cues to determine a customer identity which may then be linked to past orders and/or various order preferences. Based on the customer identity, the system may provide recommendations of additional order items or order alterations to the customer before personally identifying information (PII) has been collected from the customer. The determination of the customer identity and the determination of recommendations may be performed by one or more machine learning algorithms that are trained on customer data, the retail store product listing, and associated data. The customer responses and past orders may be used to continually update the machine learning models and improve the quality of the customer experience.

BRIEF DESCRIPTION OF DRAWINGS

A more complete understanding of the present disclosure may be obtained by reference to the following Detailed Description when taken in conjunction with the accompanying drawings. In the figures, the left-most digit(s) of a reference number identifies the figure in which the reference number first appears. The same reference numbers in different figures indicate similar or identical items.

DETAILED DESCRIPTION OF THE DRAWINGS

Figure 1:
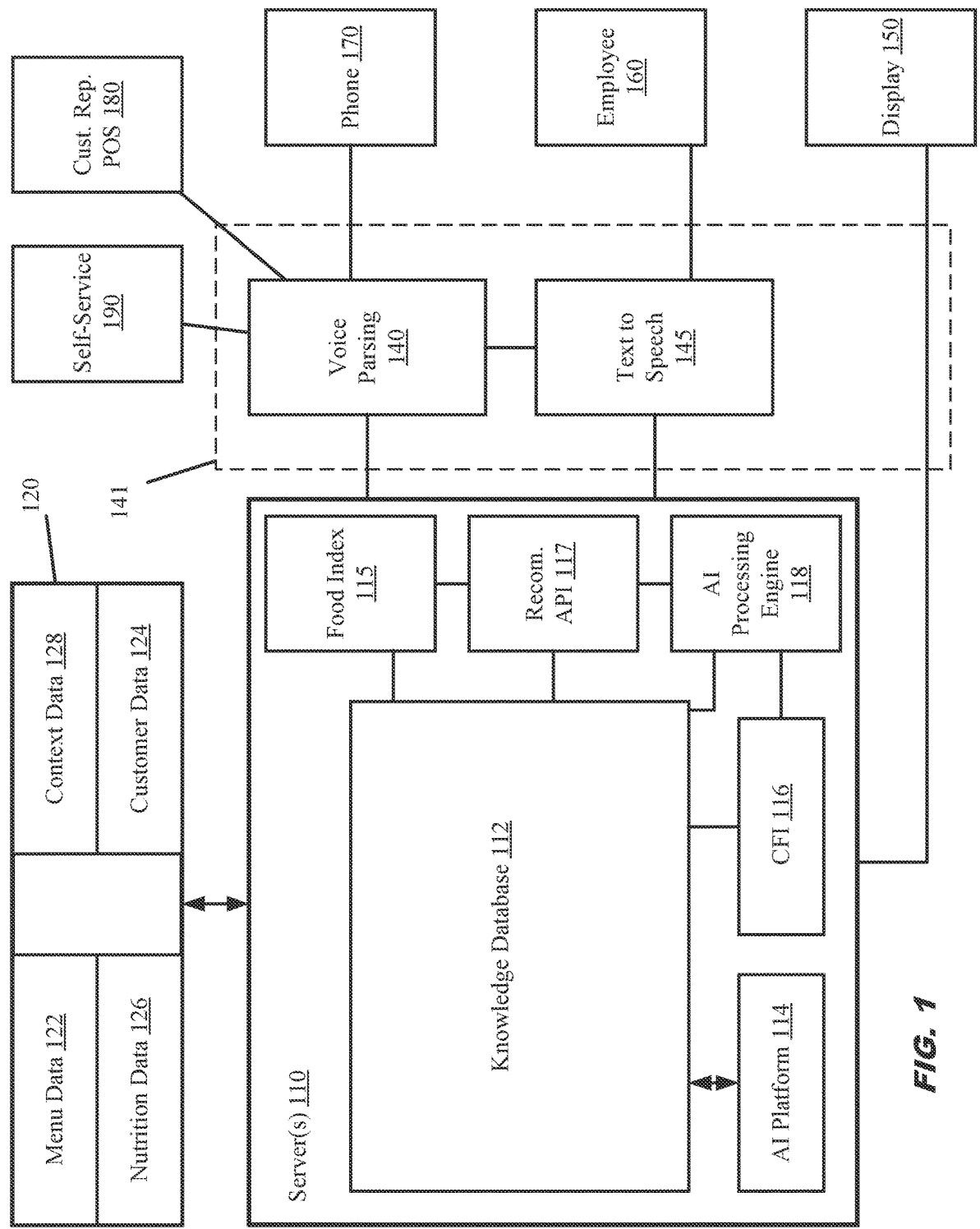
FIG. 1 is a system diagram according to an implementation of the invention.

The systems and processes disclosed herein provide quality control and/or automate various levels of the ordering process between a retail store and a customer. As a quality control process or system, it may supervise and/or review the order taking procedures of employees by connecting to various systems and may provide suggestions or corrections. As a fully automated system or process for ordering, it may handle the dialogue with the customer, provide recommendations, and communicate with order fulfillment personnel to deliver the order to the customer. In each of these implementations, a core AI assists with identifying customers, providing recommendations, and learning from customer responses.

Aspects of the present disclosure may be embodied as an apparatus, system, method, or computer program product. Accordingly, aspects of the present disclosure may take the form of an entirely hardware embodiment, an entirely software embodiment (executed on hardware) or an embodiment combining software and hardware aspects that may all generally be referred to herein as a "model," "device", "engine", "module", "component" or "system." Furthermore, aspects of the present disclosure may take the form of a computer program product embodied in one or more computer readable storage media having computer readable program code embodied thereon in non-transitory format.

Many of the functional units described in this specification have been labeled as components in order to more particularly emphasize their implementation independence. For example, a component may be implemented as a hardware circuit, an application specific integrated circuit (ASIC), executed compiled code stored on computer readable media, or a combination. A component may be implemented in programmable hardware devices such as field programmable gate arrays, programmable array logic, programmable logic devices or the like.

Components may be implemented in software for execution by various types of processors. A component of executable code may, for instance, comprise one or more physical or logical blocks of computer instructions which may, for instance, be organized as an object, procedure, or function and may be compiled into executable form for execution on a processor. Nevertheless, the executables of an identified module need not be physically located together but may comprise disparate instructions stored in different locations which, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components and may be embodied in any suitable form and organized within any suitable type of data structure. The operational data may be collected as a single data set or may be distributed over different locations including over different storage devices. The data may be structured (e.g. tables, relational database, etc.) and unstructured (e.g., language text, pictures, etc.). Where a component or portions of a component are implemented in software, the software portions are stored on one or more non-transitory computer readable storage media.

Any combination of one or more computer readable storage media may be utilized. A computer readable storage medium may be, for example, but not limited to, an electronic, magnetic, optical, electromagnetic, infrared, or semiconductor system, apparatus, or device, or any suitable combination of the foregoing. The computer readable storage media may be non-transitory and may be persistent.

More specific examples of the non-transitory computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), a Blu-ray disc, an optical storage device, a magnetic tape, a magnetic disk, a magnetic storage device, integrated circuits, other digital processing apparatus memory devices, or any suitable combination of the foregoing, but would not include propagating signals. In the context of this document, a computer readable storage medium may be any tangible medium that can contain or store a program for use by or in connection with an instruction execution system, apparatus, or device.

Computer program code for carrying out operations for aspects of the present disclosure may be written in any combination of one or more programming languages, including an object oriented programming language such as Java, Python, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer system may be a server including one or more processors and one or more non-transitory computer readable storage media to store instructions executable by the one or more processors to perform operations including, receiving order data from a first device, determining a key information from the order data, determining, using a machine learning model, a customer identifier based on the key information, generating one or more additional order items associated with the customer identifier, and transmitting the one or more additional order items to a second device.

The order data received may include speech describing one or more product items, the speech including employee speech and customer speech. The first device may perform natural language processing on the order data to interpret the speech and to identify the one or more product items. The first device may receive the order data from a customer and generate dialogue associated with the order data, the dialogue including one or more recommendations of products based on the key information from the order data, the one or more recommendations having an acceptable similarity coefficient or complementarity coefficient calculated with one or more product items in the key information.

The second device of the computer system may be an employee-facing device, the one or more additional items being displayed on the second device for an employee to relay to the customer. At least part of the order data may be input by the employee and at least part of the order data includes an employee-customer dialogue. The key information may be determined from the order data input by the employee and a natural language processing of the employee-customer dialogue. The key information may be items ordered from a list of products, a geographic location, a store location, or a combination thereof. The customer identifier may be associated with a specific customer or a specific order, the machine learning model including a classifier that selects the customer identifier. The customer identifier may be determined based only on the order or list of products. While determining the customer identifier, if the machine learning model cannot determine the customer identifier based on the key information, a classifier of the machine learning model selects the customer identifier based on an error minimization.

FIG. 1 illustrates a computer system that connects to customer-facing devices and receives voice data, item entry data, and other data and outputs suggestions to an employee or other devices. On the customer-facing side, the computer system may connect to a self-service machine 190 such as a kiosk, touch panel, automated drive-through, or other machines for receiving customer orders or related information (e.g., pickup time). The computer system may connect to a customer representative point-of-sale (POS) terminal 180 that is employee facing and operates to receive inputs (e.g., orders) from an employee. The computer system may connect to customer devices such a phone 170, or other handhelds, or via website to customer computers. These devices for receiving customer information and inputs (e.g., employee dialogue, entries, etc.) may connect to an automated voice ordering system 141 and specifically to a voice parsing component 140.

The voice parsing system 140 receives audio signals from microphones that may be employee and customer facing. That is, the automated voice ordering system 141 and/or the voice parsing component 140 may be connected to the communication and data flows between the employee and the customer. In one implementation, the automated voice ordering system 141 may be inserted as a silent middleware that follows and/or analyzes employee dialogue. As silent middleware, the automated voice ordering system 141 and the connected databases may be trained to learn appropriate responses and variations (e.g., geographical, menu, time, etc.). Likewise, the silent middleware may be used to train new employees with learned responses, order correction, and other assistance. For example, if a customer requests a suggested appetizer for the ordered entrée, the middleware may provide an answer to an employee based on learned pairing from other orders. Likewise, the computer system operating as middleware may review a customer's customizations against the item recipe to separate and flag changes from standard procedure (e.g., large latte recipe calls for double espresso shot). Similarly, the computer system may learn colloquial terms for products and correct an order list if an employee misunderstands the customer request. This is particularly advantageous in industries with high turnover, such as quick service restaurants.

The automated voice ordering system 141 may be supported by the one or more servers 110 which provide a knowledge database 112, an AI platform 114, a customer food identity (CFI) component 116, an AI processing engine 118, a recommendation application programming interface (API) 117 and a food index 115. These components may be software or hardware, or a combination thereof. As software, the components may include computer instructions that when executed on the one or more processors of the servers 110 cause the processors to perform various assistance functions for the automated voice ordering system 141 as described in more detail with regard to FIG. 3. In addition, the servers 110 may connect to one or more database servers 120 which store data in structured formats or as models to assist the AI components operating on the servers 110 in understanding customer decision making. The connections shown in the servers 110 and the database servers 120 are non-limiting and may be formed between any of the components in software, hardware, or API form.

The database servers 120 may provide menu data 122, nutrition data 126, context data 128, and customer data 124. The menu data 122 may include menu items, times of availability, seasonal data, graphics for the menu, competitor items with names, spiciness, ingredients, and other food or timing information. The customer data 124 may include regional names used for menu items, customer abbreviations for items, generalized customer statistics (e.g., localized most popular items), customer loyalty accounts, and other generalized customer information or individual customer profile information. The more specific customer data and accumulated customer data may be retained in model form in the CFI 116, knowledge database 112, and food index 115. The context data 128 may include typical customer descriptions (e.g., good, juicy, etc.), associated words collected by voicing parsing 140, colors of items, regional food items, regional ingredients, regional demographics, or other contextual information related to customers, food, or locations. The nutrition data 126 may include calorie information, ingredients, dietary information (e.g., salt, sugars, etc.), dietary restriction categories, organic flags, and other content related information.

The database servers 120 may host the knowledge database 112, CFI component 116, and other components on servers 110. The data stored in menu data 122, nutrition data 126, context data 128, and customer data 124 may be received or generated by crawling, scraping, or reading in data from the web using NLP algorithms and may include tagging of the generated data with metadata. The data stored in menu data 122, nutrition data 126, context data 128, and customer data 124 may be received or generated from past point-of-sale (POS) data. The data stored in menu data 122, nutrition data 126, context data 128, and customer data 124 may be compiled to form a dictionary or data resource tabulating (in table form) foods and their key ingredients, source, vitamins, cost, fat levels, and all other information that can be extracted from the web. The data stored in menu data 122, nutrition data 126, context data 128, and customer data 124 may be derived from or stored in the form of past orders from customers which may be utilized in the future by one of the AI models do determine complementary mappings for knowledge graphs of knowledge database 112. The data stored in menu data 122, nutrition data 126, context data 128, and customer data 124 may be related in each case or each database with contextual mappings or may be used to inform contextual mappings in knowledge graphs. These contextual mappings may include food ordered at certain times of day, during certain weather, when there is traffic, and other environmental contextual situations.

Figure 9:
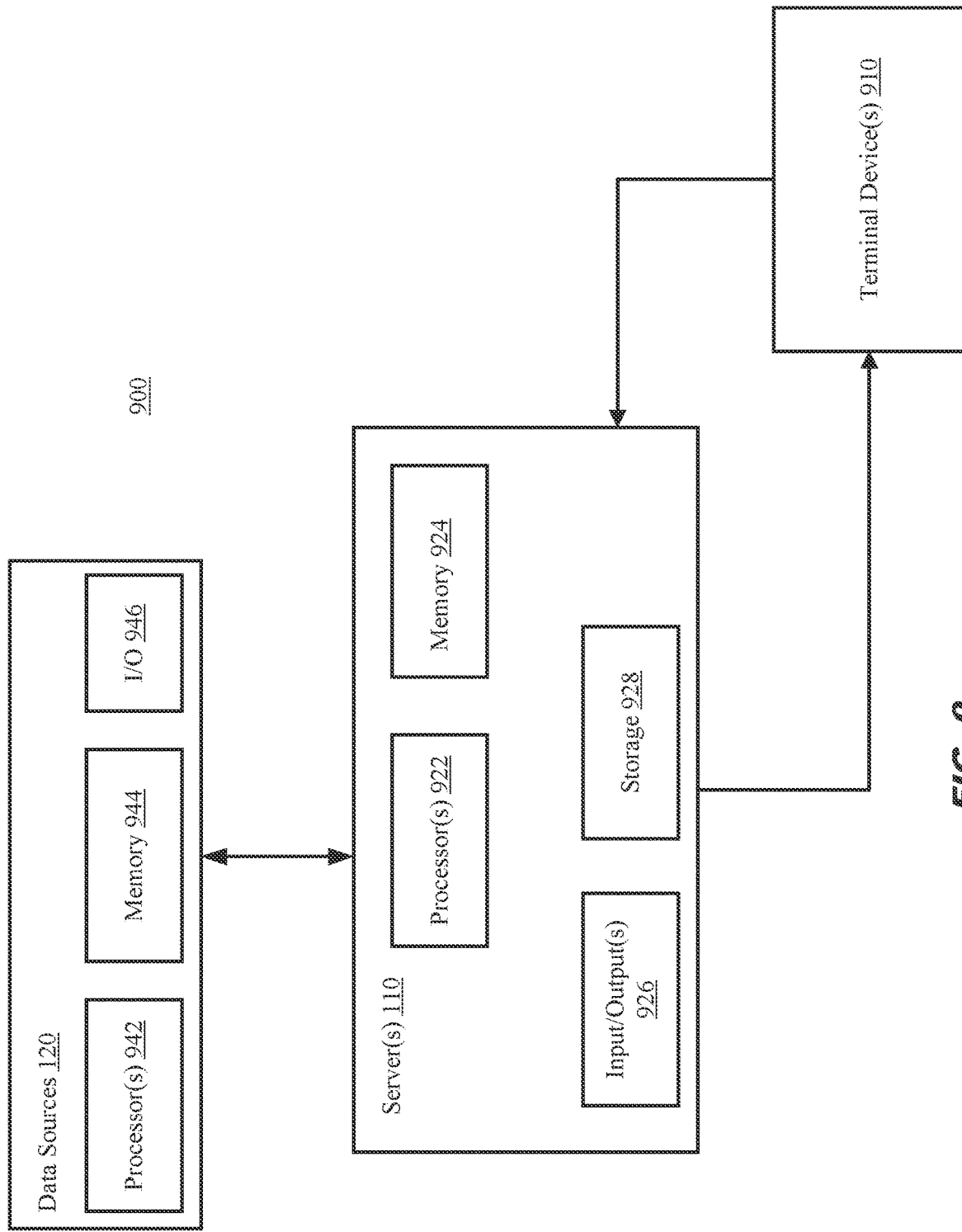
FIG. 9 is a system diagram according to an implementation of the invention.

Indeed, in some implementations, the database servers 120 and the servers 110 for processing information may be integrated together. The database servers 120 and servers 110 may be cloud computing resources, cloud instances of processors and databases, dedicated servers, or local computers with storage and processors. The diagram of FIG. 9 illustrates a system with a processing server 110 and database server 120. Other connections are contemplated such as direct connections between the database servers 120 and the automated voice ordering system 141.

The servers 110 are fed information that is parsed by the voice parsing component 140 and use that information to train machine learning models on proper automated responses (e.g., suggest extra bags or napkins, ask about condiments after certain menu items, cold drinks in summer, etc.), knowledge additions for customers (e.g., inform them that their order is vegan), and menu selection suggestions (e.g., paired drinks, combo meals for cheaper price, etc.). These machine learning models may provide these suggestions to the employee 160 or to a display 150. Specifically, the phone 170 or other handheld device may be used to call and order via voice only with an employee 160. The entire conversation is automatically transcribed and contextualized via natural language processing (NLP) in the voice parsing component 140. The automated voice ordering (AVO) system 141 may operate self-contained with only information being fed in or NLP algorithms being trained with the models and data from servers 110 and 120. The AVO system 141 may then provide suggestions to the employee 160 via earpiece. This audio feedback to the employee (or customer in a self-service 190) is generated by the test to speech engine 145 which take the knowledge from the servers 110 and 120 and integrates language elements and converts back to audio speech. The servers 110 and/or 120 or the AVO system 141 may provide information text or graphic information to a graphical user interface on display 150, phone 150, customer representative POS terminal 180, or self-service 190.

Since the knowledge provision and learning may be middleware that adds value to the AVO system 141, the suggestions may be provided primarily to the employees 160 and employee displays 150, customer representative POS terminal 180, and to customers on self-service kiosks 190, or mobile applications on the phone 170. While the employee carries the dialogue and other standard data entry for the order, the servers 110/120 and the AVO system 141 is learning and providing suggestions. The AVO system 141 may check and/or correct data entry errors from the employee based on the received customer audio. The servers 110/120 and AVO system 141 may learn from the employee and/or customer acceptance or rejection of the suggestions. This learning process and data feedback may feed one or more of the test and verification inputs illustrated in the machine learning process of FIG. 7. This learning trains models in the AI platform 114, the food index 115, the knowledge database 112 and the CFI 116.

The AVO system 141 may be hosted in the cloud as processors and storage in cloud instances of operating systems and computing resources. The AVO system 141 may include speech to text transcription (voice parsing 140), natural language processing to add context and understanding, a decision engine or natural language generator that makes decisions about how to phrase and compose output language, and text to speech engine 145. This AVO system 141 may receive supporting data, recommendations, and customer food identities from the servers 110/120 and may supply order items, item modifications (e.g., no cheese, extra sauce), contextual data (e.g., juicy, crispy, toasted), and device or call information (e.g., customer phone number, device ID, voice signature, etc.) that may be needed by the components operating on the servers 110/120.

The learning preferably may occur in real time such that the middleware processing of the customer employee dialogue enables real time suggestions or predictions that can be delivered in real time and tested in real time. The learning may occur using similar processing on recorded employee/customer interaction to test predictions on customer additions and develop the CFI and food index models. The customer and, in some cases, the employee may not be aware of the system as it collects, reviews, and provides suggestions. The machine learning may take the form of neural networks, long short term memory, knowledge graphs, data trees, classifiers, and other active/dynamic data models. These learning processes are described in more detail with regard to FIGS. 3 and 7.

Figure 2:
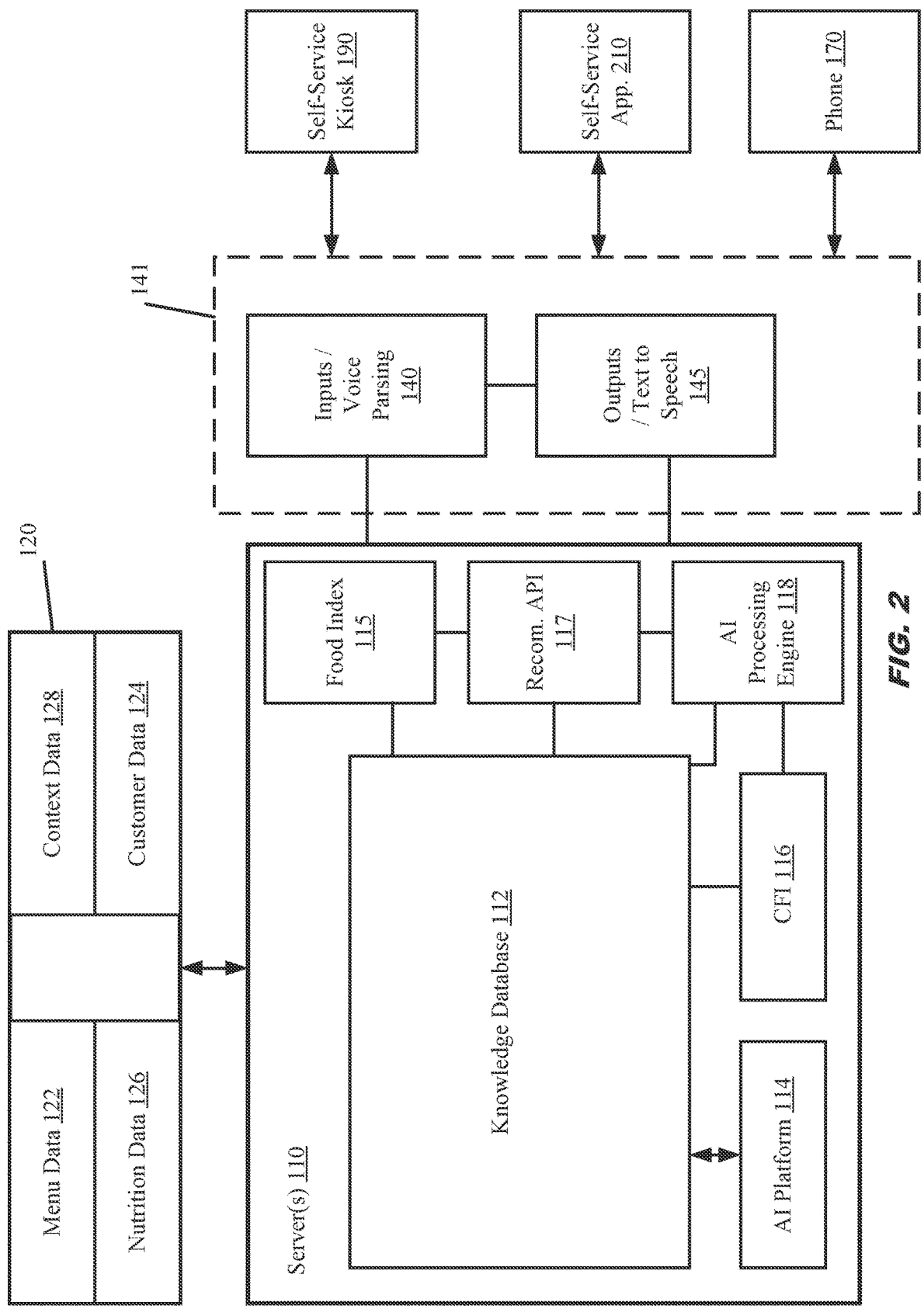
FIG. 2 is a system diagram according to an implementation of the invention.

In FIG. 2, a similar system to that in FIG. 1 is illustrated which provides fully automated ordering using trained machine learning logic at multiple levels in the processing. Equivalent structures between FIG. 1 and FIG. 2 are numbered the same. Within the fully automated system, the inputs need not be a customer representative POS terminal 180 or an employee's voice 160 but rather may come directly from the customer or customer devices. These customer devices may be phone 170, self-service application 210, and self-service kiosk 190. The phone 170 may be a tablet, laptop, personal assistant device, cell phone, smart phone, or a transmitting microphone. The phone 170 or similar device may connect (communicate/transmit) to the AVO system 141 audio signals in analog or digital format. The phone 170 may host a mobile application that connects to the system via a software interface (e.g., encrypted dedicated connection) or via an API, a client of which may be part of the mobile application. The mobile application may transmit the text of the order (e.g., menu items), payment information, customer information, customer ID, and other elements for completing the order.

The self-service application 210 may operate like the mobile application of the phone 170 but may be platform independent. That is, self-service application 210 may be a web application that executes one or more instructions to provide an interactive website to a display on a variety of devices. The interactive website may include a graphical user interface (GUI) that may adapt to one or more devices, displays, or operating systems upon execution or retrieval of the website in a web browser or the like. The self-service application 210 may provide input fields that accept the text of the order (e.g., menu items), payment information, customer information, customer ID, and other elements for completing the order. The self-service application 210 may provide an audio ordering interface for the visually impaired. The self-service application 210 may collect connection data including IP address, cookies, tokens, and location which may assist in identifying the customer and/or assigning a customer food identifier 116. The self-service application 210 may transmit the order information to the AVO system 141 as text data, voice data, or hash values.

The self-service kiosk 190 may be a dedicated display located at a retail location that displays menu items, prices, and nutrition information, and allows the customer to select (e.g., using an appendage, such as a finger) one or more menu items for purchase. The self-service kiosk 190 may provide an audio ordering interface for the visually impaired. The self-service kiosk 190 may provide input fields that accept the text of the order (e.g., menu items), payment information, customer information, customer ID, and other elements for completing the order. The self-service kiosk 190 provide order information directly to employees for fulfilling the order as well as to the AVO system for intelligent interaction with the customer. The self-service kiosk 190 may connect to the AVO system via the internet, WIFI, or via hardwire (e.g., Ethernet) within the retail location.

The AVO system 141 in either the customer/employee support system of FIG. 1 or the fully automated ordering system of FIG. 2 may connect to various devices in the retail or restaurant location such as label makers, order screens (e.g., display 150), robotic order fulfillment device, and employee earpieces. Thus, the AVO system not only provides the dialogue for communication with the customer by receiving the customer device inputs, but delivers the completed order to various devices and verifies completion of the order with an employee. The customer may then be notified that their order is complete via a mobile device (e.g., phone 170) or web interface (e.g., self-service application 210) or alert from the self-service kiosk 190. Thus, the AVO system 141 may generate alerts, reminders, status checks, and other activity monitors for employees to manage workflows and may manage the order priority list or task execution lists that determine employee tasks and workflow. The AVO system 141 may be provided in the cloud on servers or may be hosted at specific retail locations on local servers or desktop computers with connections to servers 110/120.

As illustrated in FIG. 2, the AVO system 141 receives inputs (e.g., text, order codes, etc.) and voice data, the voice data being processed by the voice parser 140 which performs NLP processes and key word extraction on the voice data. Customer modifications to menu items or the order may be processed by the NLP processes and filtered for keywords before transmission to employee facing devices or the servers 110/120. The voice parser 140 may connect directly to the outputs or text to speech component 145 which communicates with and responds to the customer via generated voice, displayed text, or software interface to an application (e.g., application 210). For order confirmation, the text received or generated at the voice parser 140 may be relayed to the text to speech component 145 and repeated back to the customer. Other parts of the dialogue or text display may be generated by the AVO system 141 based on the input information from customer facing devices.

The servers 110 and database servers 120 may receive information from the AVO system 141 and may generate information to assist with communication with the customer. The dialogue exchange and order flow may be managed by the processing servers 110 or more specifically the AI processing engine 118 or may be managed by the AVO system 141 with specific queries to the servers 110. If the AVO system 141 is implemented as call automation software that is not built or customized for the order automation system, then the servers 110 may manage the call process. If the AVO system 141 is implemented as custom software with its own machine learning models adapted (or adaptable) to the ordering process or a specific service installation (e.g., TACO BELL), then the AVO system 141 may manage the dialogue and provide specific queries and information to be stored to the servers 110/120.

Figure 3:
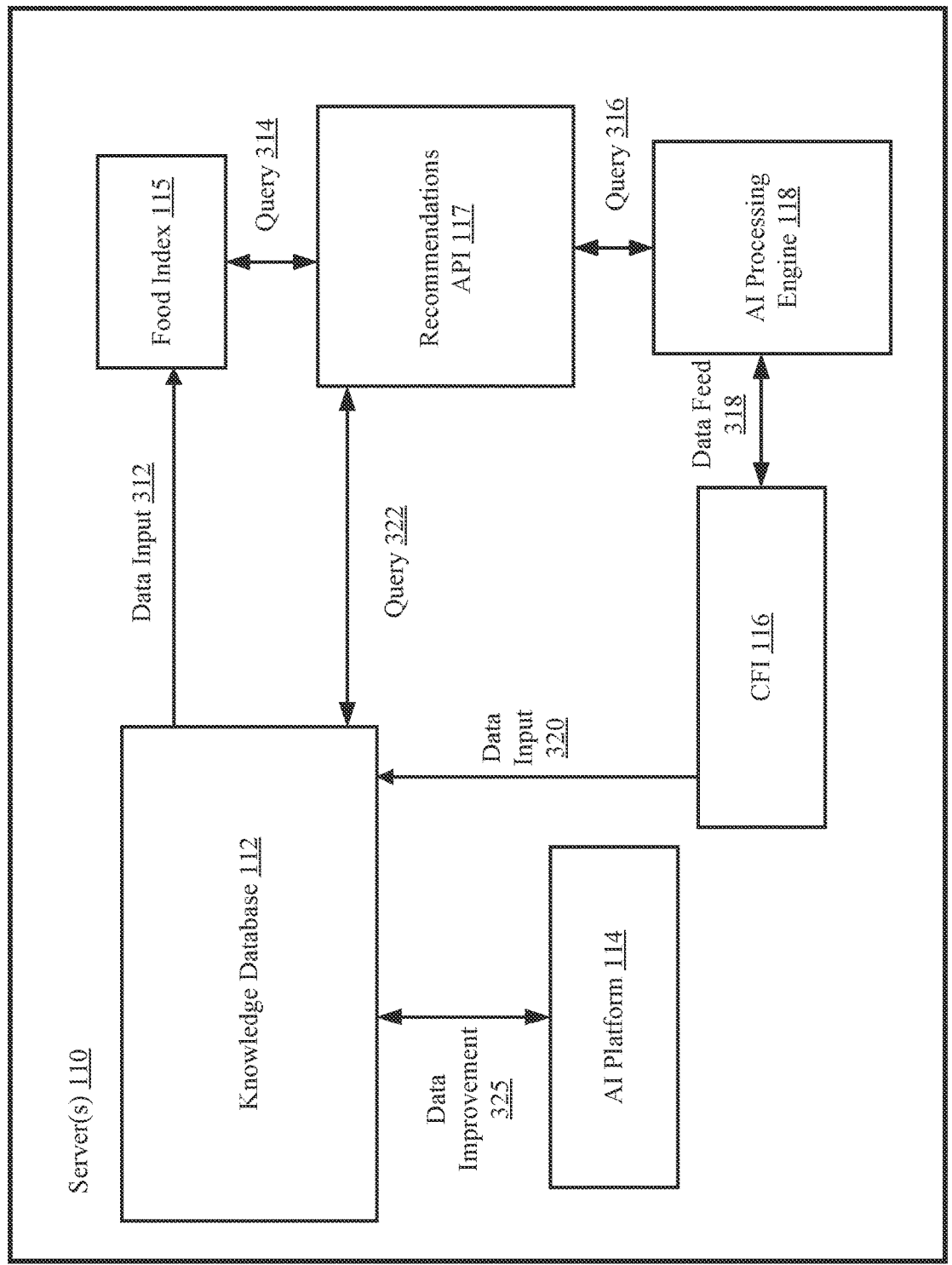
FIG. 3 is a system diagram of a components on a server according to an implementation of the invention.

In FIG. 3, a detailed illustration of the servers 110 is provided. Specifically, exemplary queries and data inputs between components on the servers 110 are illustrated. The components disclosed as operating on the server 110 may work in concert with the AVO system 141 to provide additional knowledge and intelligent processing. As a result, many queries may originate at the recommendations API 117 or AVO system 141 but may be modified or forwarded to other components throughout the system as illustrated in FIG. 3 and described below. Together the systems provide an intelligent and adaptable framework for handling orders and providing recommendations to any AVO system 141.

The knowledge database 112 may store knowledge in the form of knowledge graphs which form branched-node structures of key data. The knowledge database 112 may include a menu item similarity graph, a menu item complementary graph, similarity graphs with competitor products, and other structured data representations of order features. The knowledge graphs of the knowledge database 112 may each include metadata, a schema, at least one global identifier, and reasoning capabilities. The menu item similarity graph may define menu items that are similar or are replacements for other menu items as closest neighbors in the graph or tree and/or with a similarity score. The similarity may be based on metadata or tags associated with the menu item such as dietary types (e.g., vegetarian, vegan, etc.), nutritional types (e.g., calories per serving), ingredient groups (e.g., tomato-based), dish type (e.g., entree, starter, dessert, etc.), cooking method (e.g., baked, fried, etc.), and other characteristics. These characteristics may be stored as tables on database servers 120 for reference and for rebuilding the knowledge graphs. The complimentary menu items may be stored as a graph where nearest neighbors are complimentary (e.g., Dal Makhani and Tandoori Roti), or grouped according to characteristics and linked via complementary determinations between groups (e.g., spicy group and creamy group) in a hub-spoke configuration.

The knowledge graphs of knowledge database 112 may include facts that relate to menu items like those stored in menu data 122 and nutrition data 126 as well as opinions, ratings, cultural facts, and other qualitative information. These knowledge graphs may be formed based on implicit connections or associations. For example, the implicit association of nearby words in user interaction during the order process, including menu items considered but not ordered, and menu items ordered together. These knowledge graphs may be formed based on explicit connections or associations. For example, the menu data 122 or nutrition data 126 or context data 128 may provide categories (e.g., appetizers, vegan), ingredients that may be grouped or correlated, and other explicit connections between menu items. These knowledge sources and/or sources of connections/links may be combined into a single graph. For example, for each restaurant the menu may be analyzed and all relevant information from other menus as well as the data in database server 120 may be linked to the items in the menu to form a menu knowledge graph specific to that restaurant. This menu knowledge graph may form a starting point for AI training or a starting point for the AVO system 141 to begin taking orders or following the order process of employees.

The customer food identity (CFI) 116 may be a database structured as a tree, a graph, a relational table, or other data formats and maps customer food preferences to an identity or grouped identity. The context data 128, customer data 124 and food index 115 provide information, which in part are created by customers. For example, these databases may include ordering preferences, geographic coordinates of orders/customers, comments, order history, allergies, cuisine preferences, time of day preferences, channel preferences, promotions, portions, and other contextual data. While these data points add context and depth to the knowledge graphs of knowledge database 112, these data points may combine for each customer to form a customer identity. The customer identity may be stored as a sequence of the unique data points or a hash value of the associated data points. The customer identity may be retrieved by a proximity search or by exact match with a selection of key indicators from an order. That is, the AVO system 141 may operate to select keywords or indicators that are specific to orders (e.g., name, order items, customization request, etc.). These indicators may form the basis for the CFI 116 which may be queried by the AVO system 141 in order to identify a customer. The indicators in an order may be passed to the AI processing engine 118 which then feeds via data feed 318 to the CFI 116 and via query 316 to the recommendation API 117. The CFI retrieved in response to a query from AI processing engine 118, knowledge database 112, or recommendations API 117 may not be customer ID if none can be found (e.g., no match); instead the CFI 116 provided to the AI processing engine 118, knowledge database 112, or recommendations API 117 may be the closest match or closest, most accurate result, or the nearest neighbor to a new CFI generated by the order.

The AI processing engine 118 may develop and store machine learning models that use the CFI 116 to correlate knowledge from the knowledge graphs with customers. The machine learning models may be trained on the knowledge graphs, where the knowledge graphs provide raw classification categories that may form a starting point for machine learning classifiers. The machine learning models of the AI processing engine 118 may assist in defining classifications or categories in the knowledge graph. The knowledge graph may then be built out by the processing servers 110 using these categories and applying them to data from database servers 120. Once the raw data in the database servers 120 has been structured and intelligently represented as knowledge graphs, the machine learning may then train specific models for processing recommendations, CFI and food index such that newly received information can be classified and understood appropriately.

The AI processing engine 118 may include one or more machine learning classifiers including an extra trees classifier, a catboost classifier, an extreme gradient boost classifier, a light gradient boost machine, a gradient boosting classifier, quadratic discriminant analysis logic, linear discriminant analysis logic, a random forest classifier, a B-tree classifier, logistic regression logic, naïve bayes, an ada boost classifier, a K-neighbors classifier, a decision tree classifier, a state vector machine (SVM), a ridge classifier, long short term memory logic, natural language processing logic, recurrent neural networks (RNN), convolutional neural networks (CNN), multi-level perceptrons, feedforward neural networks, or a combination thereof. These classifiers may process the order information to provide key indicators, and/or, in a further step, may process key indicators from an order to provide recommendations to the recommendations API 117.

Figure 7:
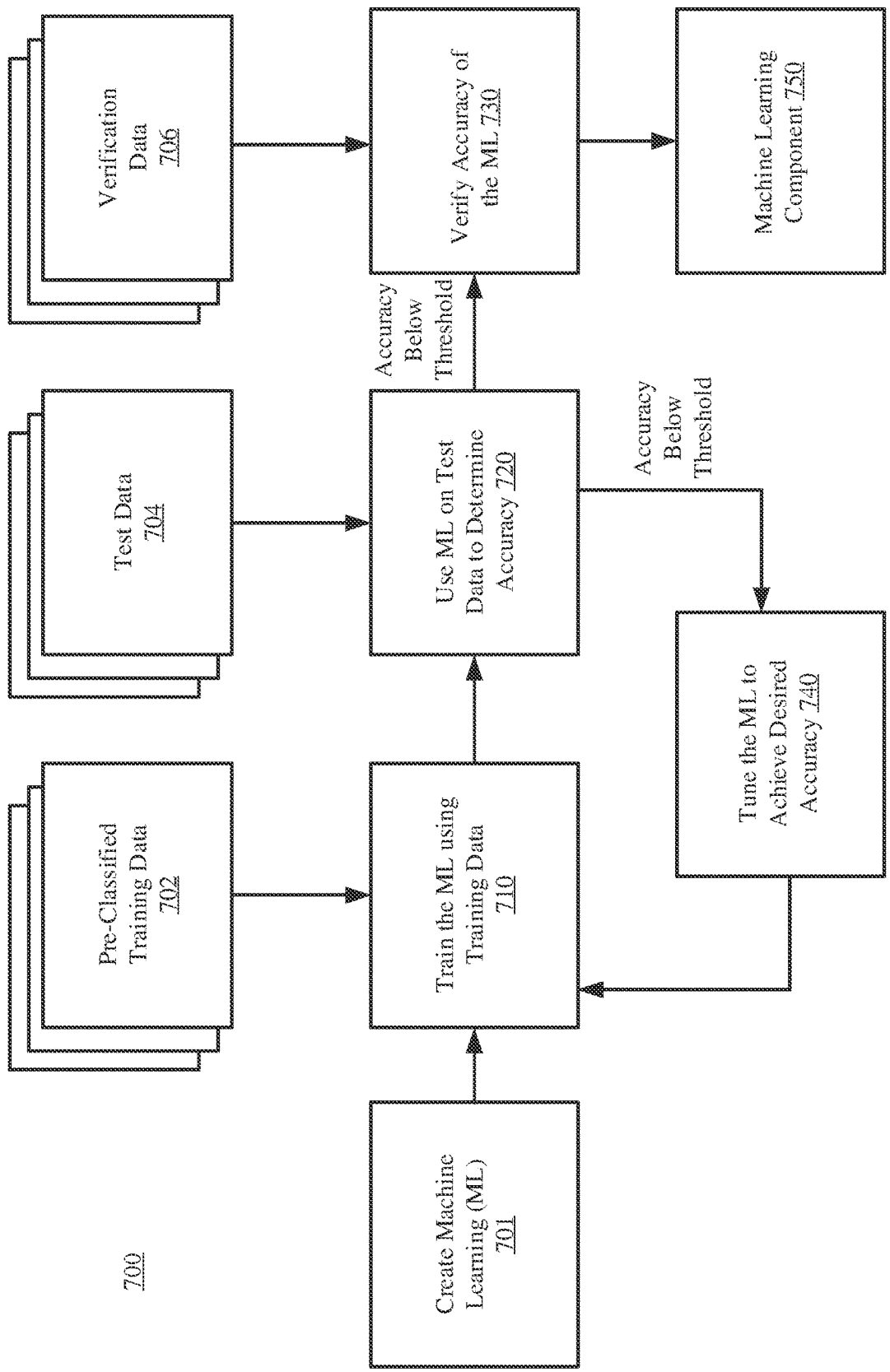
FIG. 7 is a machine learning training process according to an implementation of the invention.

The knowledge graphs provide a secondary or more structured representation of the data in menu data 122, nutrition data 126, context data 128, and customer 124. The machine learning models or classifiers of the AI processing engine 118 provide an even further refined and intelligent representation or mapping of the data in menu data 122, nutrition data 126, context data 128, and customer 124 of the database servers 120. The mappings of the machine learning models may be in the form of connections between neural network layers or regression correlations between data points which are defined by training of the machine learning model as illustrated in FIG. 7. A machine learning model based on neural networks may have one or more layers between input data and output data, where the layers form decision points in representing or understanding the input data to translate the input data into usable output data. The output data (e.g., food recommendations) may include text for integration into the dialogue with the customer via the AVO system 141.

The recommendations API 117 may query the AI processing engine 118, the knowledge database 112, and the food index 115 via queries 316, 322, and 314, respectively. The recommendations API may be accessed directly by the AVO system 141 as the connection point for requesting and receiving elements for insertion into the dialogue. The recommendations may be based on parameters including CFI, popularity, availability, collaborative filtering, context, and other order features. The recommendations API 117 may apply collaborative filtering starting on an individual basis with ordering behavior. The recommendations API 117 may map customers to particular persona models which constitute categories and sub-categories of customers with similar tastes, locations, or CFIs. These persona models are trained and updated/improved with every order so that customers can be characterized on a level between the individual level (i.e. CFI 116) and the categories of the knowledge graphs of knowledge database 112 or the customer data 124 categories. A persona model may represent or place customers within one or more distributions of customers (e.g., caller #555 (or CFI ID) is top 10 percentile for spicy food). The use of these persona models by the recommendations AI 117 may improve and filter all information retrieved from the various query sources 112, 115, and 118 such that more relevant data is supplied via the recommendations API 117.

The recommendations API 117 and/or AI processing engine 118 may assess similarity/complementarity between an order and additional items in the food index or between an order and similar customer orders based on fuzzy comparators, similarity indices, or nearest neighbor logic. For example, the similarity index may be a Jaccard index, a simple matching coefficient, a Hamming distance, a Sorensen-Dice coefficient, a Tversky index, or a Tanimoto distance, or similar coefficient calculated between the order with the other orders or products. A similarity index, such as a Jaccard similarity, may be determined between $S_i$ and $S_j$, where $S_i$ and $S_j$ are lists of products or lists of ingredients in a product, as:

$$j_{ij} = \frac{|S_i \cap S_j|}{|S_i \cup S_j|}$$

The main entrees or main combination offerings of products may be stored in the food index with similarity scores provided between each of the groups of product offerings or between their ingredients. Complementarity may be a symmetrical complementary coefficient, kappa coefficient, mean-square error, or may be based on analysis by a sequential forward selection (SFS) algorithm. The similarity determination may weight different items or products (e.g., menu items) differently based on their importance, uniqueness, or geographic location (e.g., entrees or desserts weighted highly, or extra spicy request in Indiana weighted highly).

The recommendations API 117 may, via query 316, request recommendations relevant to a particular persona from the AI processing engine 118 or may request that the AI processing engine 118 retrieve a CFI 116 for the customer and relay any details or recommendations associated with the CFI 116. The recommendations API 117 may, via query 314, request relevant food details or other menu item features from the food index 115. The food index 115 may store the data compiled in the knowledge database 112 and/or knowledge graphs as an easily-queried relational table which may be updated periodically via data input 312 from the knowledge database 112. Thus, the recommendations API 117 may query the food index 115 for menu item information such as spiciness, nutrition contents, or available modifications to answer direct customer questions about these items. Therefore, the recommendations API 117 may function as a retrieval API that provides intelligent access to the knowledge database 112, the food index 115, and AI processing engine 118 for quick implementation with an AVO system 141.

The CFI 116 may provide data inputs 320 into the knowledge database 112. These data inputs 320 may include new customer food identifiers, new information added to a CFI, or new key indicators for the CFI. These data inputs 320 may then be ingested by the knowledge graphs in appropriate locations based on the knowledge graph building logic. This graph building logic may manipulate, build, and/or insert into the tree structures of the knowledge graph. The graph building logic may be implemented as part of the AI platform 114 which provides data improvement iterations 325 for the knowledge database 112. The CFI 116 provided in data input 320 may be the nearest or closest matching CFI to a particular situation or graph node. The similarity between one CFI (e.g., a newly created CFI representing an order) and another CFI (e.g., long time customer with order history) may be determined based on fuzzy logic comparators, similarity indices, complementary coefficients, mean-square error (e.g., minimization of error), and tree traversals. While a CFI may be predicted at the order stage, the customer payment at the close of the transaction may confirm another, different CFI as corresponding to the customer. This test at payment may provide training material, test data, or verification data as illustrated in FIG. 7.

The AI platform 114 may operate as a continuous computing process or system that augments the existing knowledge of knowledge database 112 or existing data of database servers 120 with context. The AI platform 114 may engage in parallel discovery of relevant indicators, metrics, order item features, associations, and other metadata for addition to the knowledge graphs. In addition, the AI platform 114 may be configured to re-map or re-organize the trees, connections, nodes, lists, or rankings that form the knowledge graphs. The AI platform 114 may delete connections, nodes, data, or entire trees from the knowledge database 112. The AI platform 114 may enable the merge or import of data into the knowledge graphs. The AI platform 114 may continuously update the knowledge graph to reflect connections and learned correlations derived at the AI processing engine 118 and learned from observed ordering behavior. That is, the AI platform 114 may assist in converting complex machine learning connections from neural networks and classifiers of the AI processing engine 118 to the simpler format of knowledge graphs. The AI platform 114 may provide a window into the knowledge database 112 and AI models of AI processing engine 118. Specifically, the AI platform 114 may provide context, recommendations, transaction analytics reporting, customer analytics reporting, dietary food recommendations (e.g., ingredient changes), and other recommendations or data summaries for company owners.

The components on server 110 operate to perform at least three functions. First, individually and in combination, the components 112, 114, 115, 116, 117 and 118 along with AVO system 141 perform data extraction and tabulation, extracting key relevant data from voice streams, the web, images, video, menus, and other information sources. This data is tabulated into relational tables, dictionaries, and indexes (e.g., food index 115). Second, the data is contextualized and connected to form more useful data, knowledge, or intelligent data. This data processing stage may begin with cleansing of the extracted data which may include removing duplicates, correcting or removing corrupt data, and removing unreliable or unrelated data. Then additional data may be inferred from the cleansed data, obtaining additional facts or information about one or more menu items based on information in the cleansed data. Likewise, connections may be inferred based on proximity in use (e.g., NLP), or commonalities in usage, or repeated use of terms for various items. Once cleansing and inferring are complete, then the connected/inferred data and other data may be localized and further contextualized such that geographic variations can be understood and mapped into the data. Third, after the data processing stage, queries may be issued to request the compiled, connected pieces in the knowledge graphs produced by the second or third stage.

These queries may originate at the AVO system 141 and may be categorized as deep and narrow. The deep category requires greater understanding of the customer, geography, and food relationships. For instance, a deep query may request a prediction of the likely next food to be ordered by a customer in a specific region which has already ordered three other items. Such a request may require AI processing engine 118 to retrieve the CFI 116, information from the food index 115, and connections/data from knowledge database 112 in order to deliver an answer based on one or more trained machine learning processes of the AI processing engine 118. A narrow query may include simple pairings or drink recommendations. For example, the AVO system 141 may request the recommended drink for pepperoni pizza, which recommendations API 117 may be able to complete in a single query to the food index 115 or the knowledge database 112. The three-stage process of data extraction, knowledge creation, and responding or testing with queries may apply to machine learning models as well as illustrated in FIG. 7. These three stages may form a start up process for the order automation system.

For the knowledge graphs of knowledge database 112 and the processes of cleansing, inferring, and responding to queries may be repeated whenever new data is received or when the responses to queries are rejected by the recommendations API 117 or rejected by the customer. For machine learning models, the processes of cleansing, inferring, and responding to queries may be repeated whenever new data is received or when the responses to queries are rejected by the AI processing engine 118 or rejected by the customer. The three-stage process of cleansing, inferring, and responding to queries may apply to updating the machine learning logic of the machine learning models in the AI processing engine 118, the AI platform 114, or the recommendations API. In this case, cleansing can include removing rarely used connections between neural layers or returning a classifier threshold to an average or to zero. Likewise, CFIs 116 may be cleansed, inferred (e.g., two CFIs may be merged based on matching personal identifiers), and queried.

Figure 4:
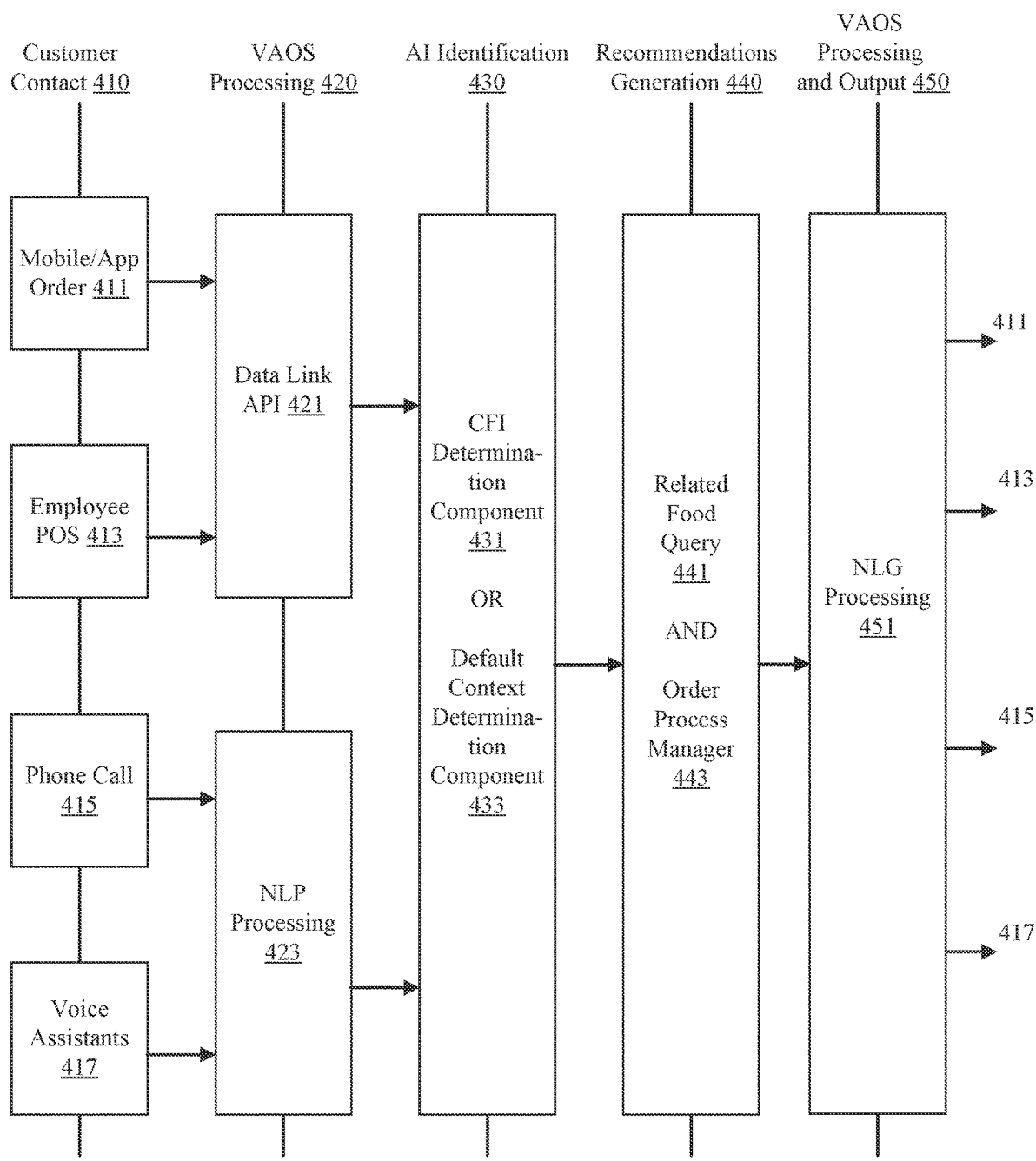
FIG. 4 is a sequential flow diagram of the system according to an implementation of the invention.

FIG. 4 illustrates a typical order flow across the various systems as part of a complete dialogue or transaction or one or more steps of the dialogue, order or transaction. The process of FIG. 4 does not characterize all the capabilities of the order automation system but rather focuses on the process for obtaining and using a CFI in an order dialogue. A customer may initiate a customer contact 410 by opening a mobile application, greeting an in-store employee, dialing a phone number, or talking to a voice assistant on a mobile device (e.g., APPLE SIRI). A mobile or application-based order 411 may be text information, metadata, and other computerized information characterizing an order from a customer to one or more companies or retail establishments. The employee POS terminal 413 may be utilized by an employee to enter customer order information in a face-to-face order. The face-to-face order may be recorded as well so that the customer order information from the employee POS terminal 413 and recorded voice data may be supplied to the data link 421 and/or NLP processing 423. The phone call 415 from the customer may be routed to the NLP processing 423 of the voice automated ordering system processing 420 which may be performed by the AVO system 141. A voice assistant 417 may pass along voice data or snippets that are relevant to an order once the voice assistant 417 has determined the order if for the particular restaurant or retail location. The voice assistant 417 may connect to the data link API 421 if the voice assistant performs its own NLP processing and translation to comply with the data link API 421.

The data link API 421 receiving the order information may require specific data formats or specific orderings of the text data and metadata. Once the data link API 421 has received the order information, the data may be transmitted to the CFI determination component 431 for matching with a CFI in the CFI database 116. If no CFI can be determined, the data is transmitted to the default context determination component 433 to determine a closest or the most accurate CFI based on the context and data of the order. Likewise, the NLP processing 423 of the VAOS processing 420 of the AVO system 141 may transmit the order data to the CFI determination component 431 for matching with a CFI. If no CFI can be determined, the data is transmitted to the default context determination component 433 to determine a closest or the most accurate CFI based on the context and data of the order. The data transmitted for the determination of the CFI may be a hash of key identifiers or the key identifiers themselves for the order/customer which have been selected or isolated by the data link API 421 or the NLP processing 423.

Once the CFI for the order or the most accurate CFI available has been determined through the AI identification process 430 which may operate in the AI processing engine 118, the AI identification process 430 may pass the CFI to the recommendations generation process 440. The recommendations generation process 440 may operate as part of the recommendations API 117 or operate on the AI processing engine 118 in response to queries from the recommendations API 117.

In either case, the appropriate CFI is transmitted to begin the recommendations generation process 440. The recommendations generation 440 may include a related food query 441 to the food index 115, to the knowledge database 112, or to the database servers 120 to request food related to a CFI or to food in an order (e.g., upon a narrow request from a customer for a recommended drink combination). The recommendations generation 440 may then select or identify one or more recommendations from the related foods retrieved in response to the query. The recommendations generation 440 may include an order process manager 443 that analyzes the dialogue flow and determines an appropriate insertion point for a recommendation and the appropriate language for the insertion point. Once the text of the recommendation has been formulated based on the identified recommendation and the insertion point, the text may be transmitted to the natural language generator (NLG) 451 of the text-to-speech component 145 for output as speech to the customer in the phone call 415 or at the voice assistant 417. Likewise, the text of the recommendation may be transmitted to the mobile or application-based order 411 (e.g., web application 210, self-service kiosk 190, etc.) or to the employee POS terminal 413 for the employee to read to the customer. The VAOS processing and output 450 of the AVO system may manage the NLG processing 451 and voice delivery to the outputs 415/417 or relay the text to outputs 411/413. The customer may then accept or reject the recommendations.

Figure 5:
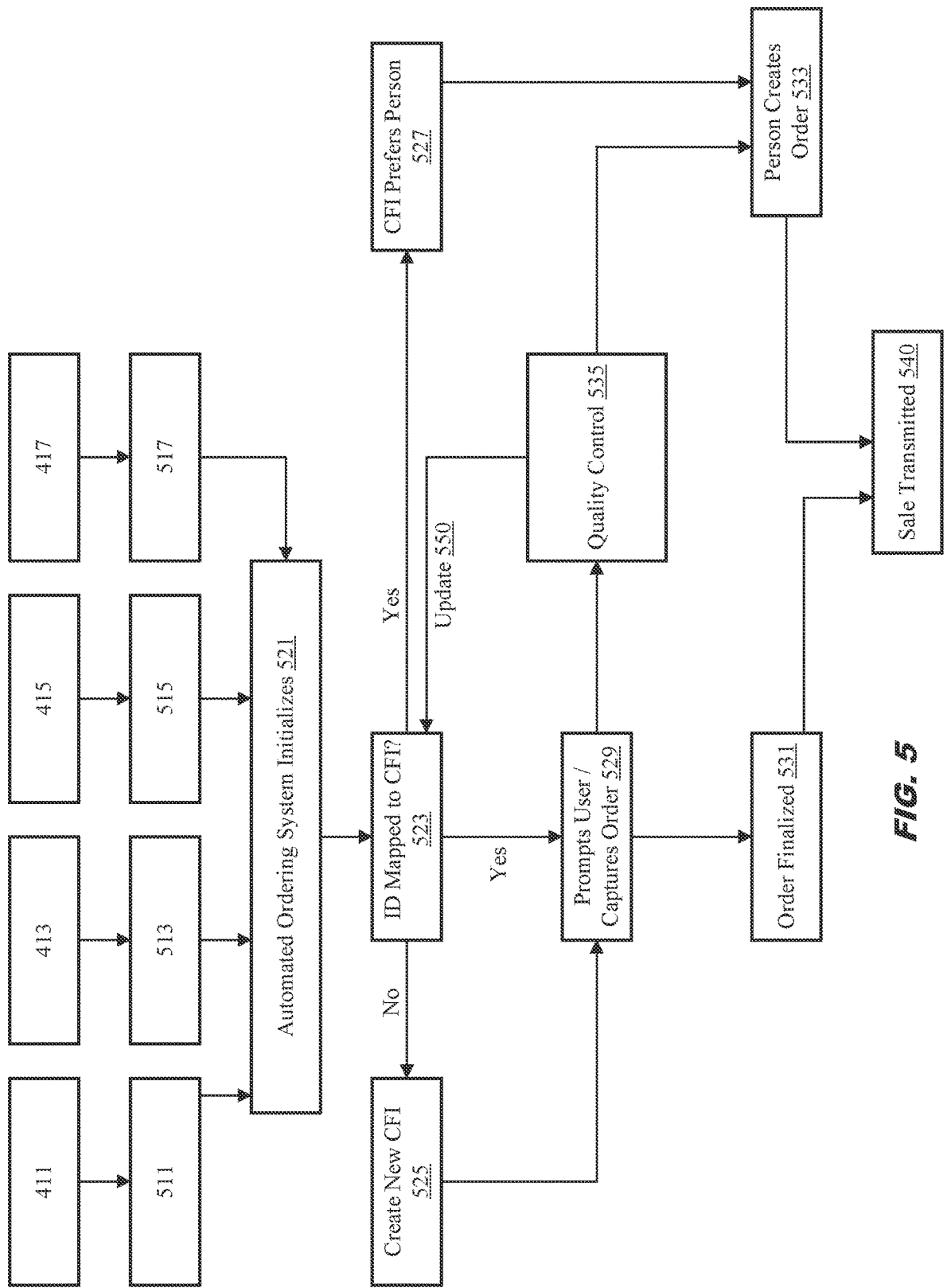
FIG. 5 is a data flow diagram of the system according to an implementation of the invention.

FIG. 5 illustrates a data flow from the initiation of the order and the inputs from the customer at 411-417 to the sale being finalized and transmitted at 540. The inputs are mobile or application-based orders 411, employee POS terminals 413, phone calls 415, and voice assistants 417. From a voice assistant 417, the automated order system may obtain or the voice assistant may transmit a user ID 517 for the initiating device. From a phone call 415, the phone number 515 may be received and identified. From an employee POS terminal 413, the employee may request a loyalty card, phone number or other membership ID 513 (e.g., QR code, bar code). From a mobile order or application order 411, a user ID 511 is obtained from the application. The identification (ID) numbers, codes, or usernames are provided to the automated ordering system or AVO system 141 which, at 521, initializes contact with the customer-facing device. The received IDs are then checked at 523 to determine if they are mapped to a CFI.

If the ID information is mapped or associated with a CFI, the AVO system 141 may check at 527 if the CFI or a profile associated with the CFI indicates that the customer prefers a person to execute or handle their order. If the customer profile associated with the CFI indicates that customer prefers or has requested a person to handle their order over the automated system, then the dialogue or communication connection may be directed to an employee. The employee then creates the order at 533 based on the dialogue. Even in this scenario, the automation system may receive and monitor the call in order to provide recommendations and to perform quality control 535. The order is completed, and the order or sale is transmitted at 540.

If no CFI can be identified based on the initial identification, the AVO system 141 may create a new CFI 525, which may simply be a temporary or empty CFI since no order information has been received at this point. The new CFI or all CFIs in the system may be hash values of the respective username, phone number, or user ID associated with the customer. If no identifiable information is received (e.g., employee POS), the AVO system 141 may advantageously issue or create a temporary CFI that may then be filled or particularized based on the order details or payment information.

If a new CFI is created or if a CFI is identified and the system does not indicate that the customer prefers personal assistance, then the AVO system 141 initiates a dialogue and requests the customer's order at 529. At 529, the AVO system 141 may perform several iterations of dialogue with the customer, including requesting name, address (for delivery), payment details, order items, and relaying the total cost, order summary, delivery time, etc. One of these iterations may be a recommendation for an additional order item based on the CFI or the other order items. Once the customer confirms the order or order summary, the order is finalized at 531 and the AVO system 141 may process payment and may close a connection with the customer. Then at 540, the sale may be transmitted to the retail location or restaurant for fulfillment and delivery.

Throughout the automated ordering dialogue at 529, the conversation is monitored by quality control 535 which can use customer corrections to improve the NLP algorithms 423 or recommendations API 117. Additionally, once a unique order is placed or the customer gives additional details such as name or address, the AVO system 141 may use the quality control 535 process to update the CFI for the customer or order via update 550. Specifically, the quality control 535 may identify the new identifying information from the conversation and provided the updated information to the CFI mapping or AI identification 430. The updated CFI at 523 may then be provided to the ongoing dialogue process at 529 to be used in updated recommendations or order processing. If a new CFI was issued or created at 525 prior to the update 550, then the process at 523 may delete that CFI or merge them if new identifying information is present (e.g., a new phone number).

Figure 6:
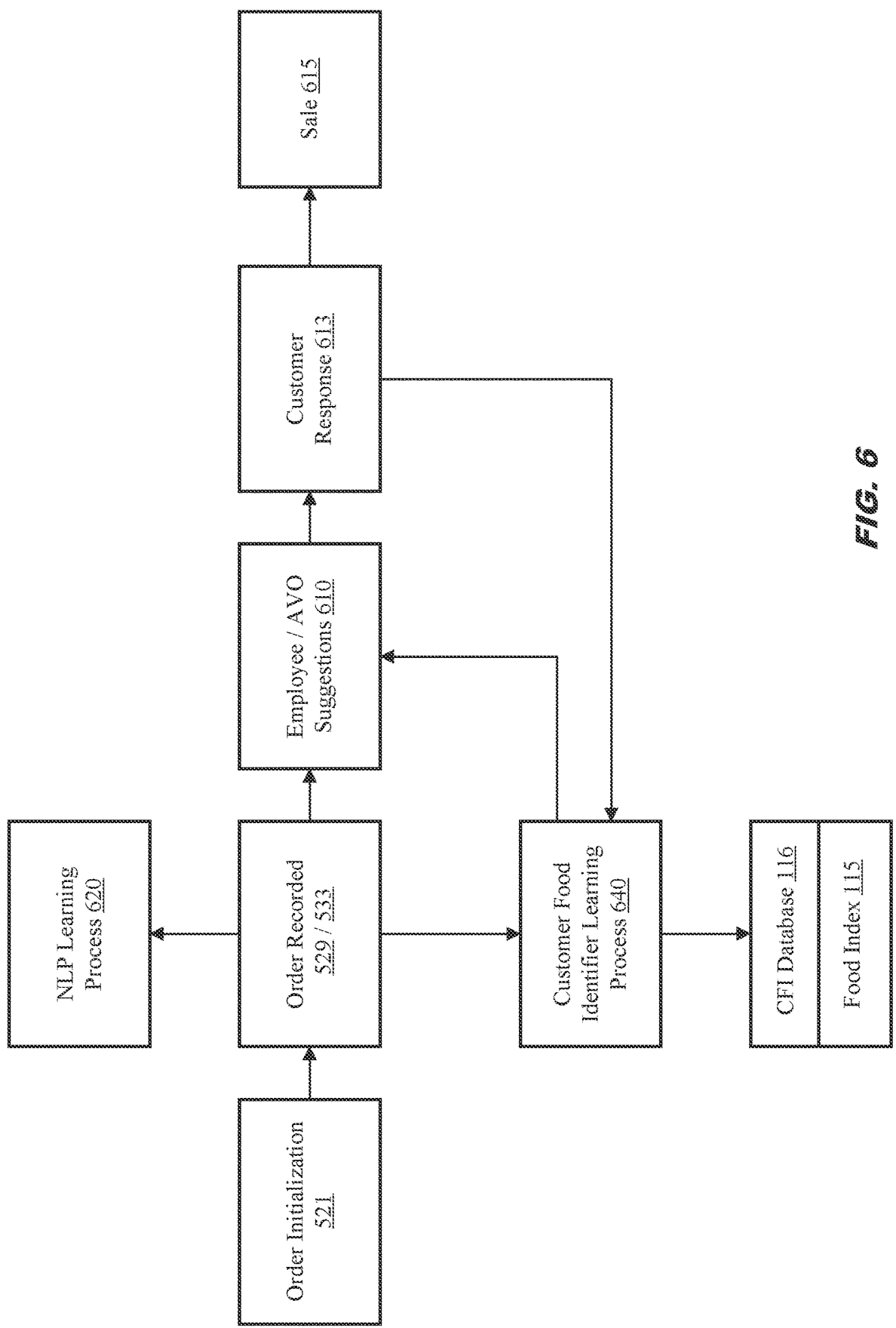
FIG. 6 is an order flow diagram of a process of the system according to an implementation of the invention.

The flow diagram of FIG. 6 illustrates a training process for NLP algorithms and AI processing engine 118 which may be used to identify the customer CFI. The training process may take place in parallel to the employee-based ordering process as disclosed in FIG. 1. The training process of FIG. 6 may follow in parallel with an automated ordering process as disclosed in FIG. 2. The training process improves NLP machine learning by local names, colloquialisms, slang, and other language elements obtained from the order. The training process improves the CFI database by creating or updating CFI values and improves predicted recommendations based on the CFI. The CFI learning process 640 may update the CFI database 116, the food index 115, the knowledge database 112, or other databases based on the improved information.

At 521, the AVO system and/or the employee initialize an order process or order dialogue. At 533, the order may be recorded at an employee POS terminal or, at 529, the AVO system may record the order from the customer. If no CFI has been previously matched as outlined in FIG. 5, then the CFI learning process 640 may use order information including name, address, phone number, and other identifying information to create a new CFI for the customer. The CFI learning process 640 may identify the closest CFI that correlates closest to the order provided by the customer. The CFI learning process 640 may use this closest CFI to generate a recommendation for a newly created CFI which has no order history.

Once a CFI has been identified or a closest CFI has been identified, the Ai processing engine 118 which is learning may recommend one or more foods most commonly added by that CFI in prior orders, or complementary foods to the ordered foods, or similar foods to those commonly added in the past (if favorites were discontinued, for example). In part, the recommendation flow and processing may depend on how much information has been learned already. The AI processing engine 118 may be capable of generating recommendation purely off the present order items and the ingested information at the data building step (e.g., building the menu knowledge graph). Throughout the learning process, the customer descriptions and terms used in the order may be learned and stored in the CFI database 116 as identifying features of the customer (e.g., customer nickname for a regularly ordered combination) or in the food index 115 as relating to the food item.

The recommendation from the AI processing engine 118 as part of the CFI learning process 640 may be provided at 610 to the employee at a POS terminal or earpiece, or to the customer as a part of the automated dialogue of the AVO system 141. At 613, the customer will likely respond to the suggestion or recommendation and this response may be incorporated into the final order, but may transmitted to the CFI learning process 640 to improve future recommendations for that CFI database 116 and change one or more food relationships in the knowledge graphs of the knowledge database 112 and one or more food relationships in the food index 115. After the customer response 613 is incorporated into the order, the sale is finalized at 615 and the retail location is contacted with the order information.

FIG. 7 is a flowchart of a process 700 to train a machine learning algorithm, according to some implementations. The process 700 may be performed by the one or more processing servers 110 of FIG. 1-2. The training may be applied to NLP algorithms of the AVO system 141, applied to machine learning models for classifying customer orders in the AI processing engine 118, applied to machine learning models for identifying order recommendations, and applied in the AI platform 114 to improve the knowledge graphs of the knowledge database 112.

At 701, the machine learning algorithm (e.g., software code) may be created by one or more software designers. At 710, the machine learning algorithm may be trained using pre-classified training data 702. For example, the training data 702 may have been pre-classified by humans, by machine learning, or a combination of both. After the machine learning has been trained using the pre-classified training data 702, the machine learning may be tested, at 720, using test data 704 to determine an accuracy of the machine learning. For example, in the case of a classifier (e.g., support vector machine), the accuracy of the classification may be determined using the test data 704. The test data may be past orders recorded in a point-of-sale system, for example.

If an accuracy of the machine learning does not satisfy a desired accuracy threshold (e.g., 95%, 98%, 99% accurate), then at 740, the machine learning code may be tuned, to achieve the desired accuracy. For example, at 740, the software designers may modify the machine learning software code to improve the accuracy of the machine learning algorithm or prune the training data. After the machine learning has been tuned, at 740, the machine learning may be retrained, at 710, using the pre-classified training data 702. In this way, 710, 720, and 740 may be repeated until the machine learning is able to classify the test data 704 with the desired accuracy.

After determining that an accuracy of the machine learning satisfies the desired accuracy threshold, the process may proceed to 730 where verification data for 706 may be used to verify an accuracy of the machine learning. After the accuracy of the machine learning is verified, at 730, the machine learning component or logic 750, which has been trained to provide a particular level of accuracy, may be used. The process 700 may be used to train each of multiple machine learning algorithms. For example, as part of the recommendations API 117 or the AI processing engine 118, a first machine learning may be used to make first predictions recommendation nnn, a second machine learning may be used to predict recommendations mmm, a third machine learning may be used to predict ppp, and so on.

Figure 8:
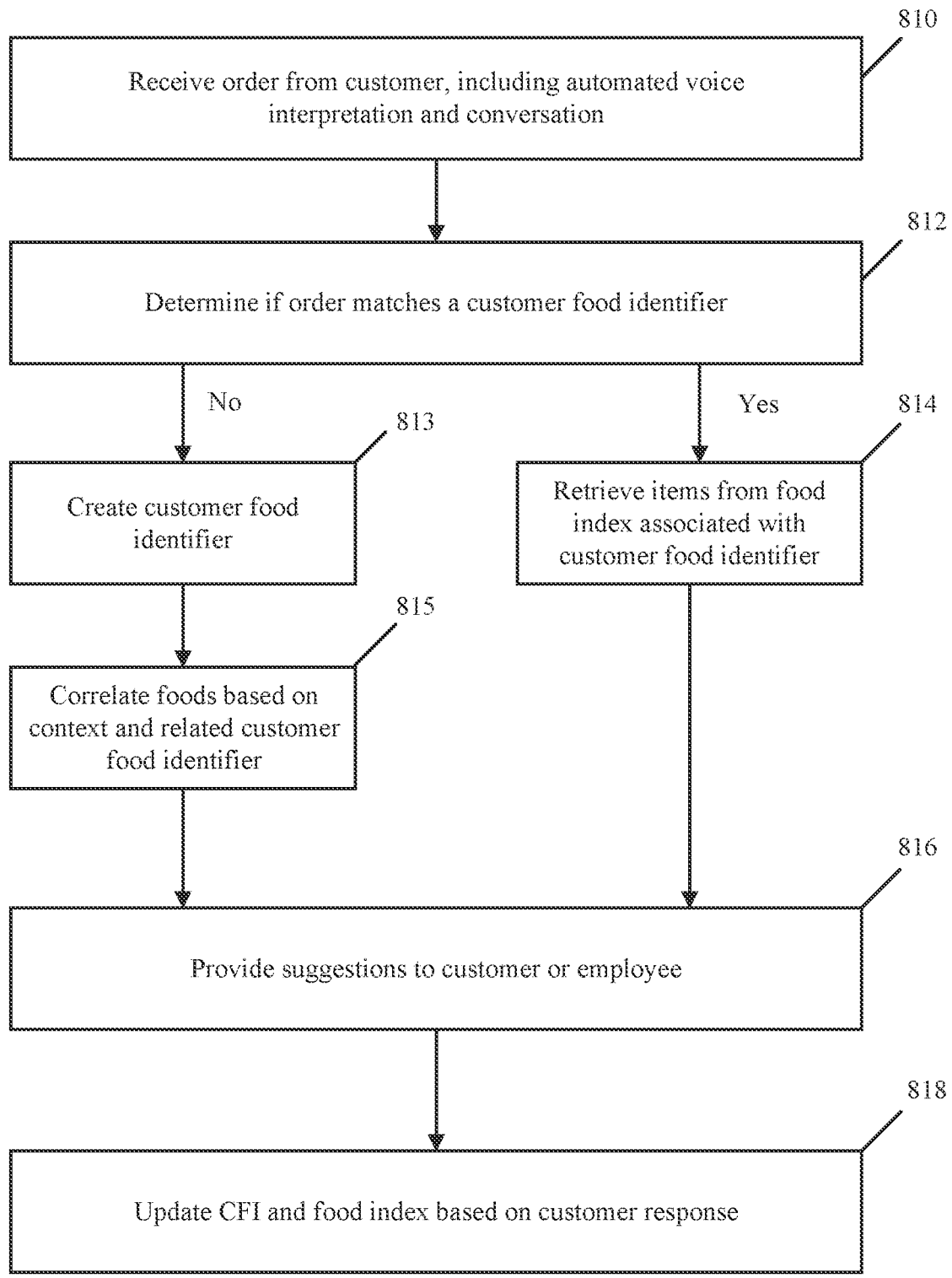
FIG. 8 is a process executed by the system according to an implementation of the invention.

The process of FIG. 8 provides a method of determining a CFI based on order information. This order information may or may not include personally identifying information such as phone numbers, usernames, etc. In the case that personally identifying is present, the CFI may be more quickly identified by this means. As noted previously, however, one of the difficulties of tracking or understanding customers in the quick service restaurant space is the lack of such identifying information early in the ordering process. Thus, the process for identifying a CFI or creating a CFI that characterizes a unique order combination is important to handling these cases where no information about the customer is ever received (e.g., cash payment) or is received only at payment. By determining a CFI for a customer at the earlier stage of the order receipt, the order automation system may generate recommendations before the customer finalizes the order and pays.

The process of FIG. 8 may begin at 810 with receiving an order from the customer, including via automated voice interpretation and conversation. As noted in FIG. 4-6, initialization of an order process may begin before the receipt of the order and may include identifying information that may be immediately matched to a CFI before receipt of an order. In cases where no corresponding CFI is present, or in cases where no identifying information is provided, the process for determining a CFI may begin at 810 upon the receipt of at least part of the order. The AVO system 141 may handle the automated voice interpretation (e.g., NLP processing) and conversation (e.g., NLG processing) for customer contacts that are voice or audio based (e.g., drive-through microphones, phone calls, voice assistants, etc.). The AVO system 141 may monitor and record order information for orders received at employee POS terminals (e.g., employee POS terminal 413) using automated voice interpretation or may monitor orders received via mobile application or web application. If no corresponding CFI can be identified for the customer (whatever the order source), then the order may be analyzed to determine if the order matches a CFI at 812.

If no CFI matches the order (or partial order), then the AI processing engine 118 may create or generate a new CFI at 813. The match need not be exact (e.g., customer may change drink order), the AI processing engine 118 may determine a confidence interval for a matching CFI and may accept CFIs with lower than 100% confidence as matching (e.g., 60%, 70%, 80%, 90%, 99%, or therebetween). The generated CFI may be a hash value of the order items, a hash value of key order items, a hash value of unique item combinations in the order, or other representations of one or more order items. At 815, the AI processing engine 118 or other components on servers 110 may correlate one or more additional menu items as complementary or commonly ordered together with the order items of the received order. The correlating food and corresponding recommendation may be based on complementary food data in the food index 115 or in the knowledge graphs of the knowledge database 112.

If a CFI is matched within an acceptable, predetermined confidence interval at 812, then at 814, the AI processing engine 118 or other components of the servers 110 may retrieve (via query) one or more foods correlated with the CFI or one or more foods in the food index 115 associated or linked with the CFI. The one or more foods retrieved may be checked against the current order to remove duplicates. The CFI may be matched based on the order items as well as location, colloquial terms, time of day, and other order characteristics that may be apparent or detected by the time the order is received.

The order automation system may then provide suggestions or recommendations to the customer or employee at 816 as order alterations (e.g., remove eggs from fried rice for vegan) or as order additions (e.g., slice of cake). These suggestions or recommendations may be inserted into the dialogue of the AVO system 141 or may be displayed on an employee POS terminal, web application, mobile application, or drive-through display. The customer may then respond to the displayed suggestion or to the voice prompt or to the employee and accept the change or reject the change.

At 818, the order automation system or AI processing engine 818 or AI platform 114 may update the food index 115, the knowledge graphs, and/or their machine learning logic based on the customer response. The associated foods with the CFI may be changed or weighted differently. The customer response may be treated as verification data 706 or test data 704 in a continuous improvement process for the machine learning models that provide the recommendations, CFI identification/matching, and food correlations. The customer response may be used to update or change one or more knowledge graphs, or one or more nodes or connections in the knowledge graphs of knowledge database 112. These updates advantageously improve responses and allow for live training of the order automation system and machine learning models of the AI processing engine 818 or AI platform 114. After the customer response, the system may execute one or more additional processes to complete/finalize the order as described with respect to FIG. 4-6.

FIG. 9 illustrates a system diagram of an automated ordering system 900 with the hardware elements that execute and perform the processes described with respect to FIG. 3-8. Specifically, servers 110 may include one or more processors 922 for executing computer instructions and performing one or more processes. The servers 110 may include one or more inputs or outputs 926 which may connect to terminal devices 910. The inputs or outputs (I/O) 926 may include gigabit ethernet, WIFI, universal serial bus (USB), TCP/IP, and other hardware interfaces and connection protocols. The terminal devices 910 may be the employee POS terminals 413, phones 415, voice assistants 417, mobile or handheld devices, displays, or other computing devices. The AVO system 141 may be hosted on servers 110 or connected as a terminal device 910. The servers 110 may contain storage 928 (e.g., hard drives, solid state drives, optical drives, etc.) for storing the knowledge graphs of the knowledge database, the CFI database 116, food index 115, and other data and computer program instructions. The servers 110 may contain memory 924 (e.g., random access memory) for storing data being processed and computer instructions being executed.

The servers 110 may be cloud instances of hardware that includes processors 922, I/O 926, storage 928, and memory 924 as well as other hardware and accessories (e.g., displays). The servers 110 as cloud instances may be thinly provisioned such that storage, memory, and processor resources are assigned dynamically according to need or demand. The servers 110 may be implemented as a desktop computer having processors 922, I/O 926, storage 928, and memory 924 as well as other hardware and accessories (e.g., displays). The servers 110 may connect to data sources 120 or databases 120 which may include processors 942, memory 944, and I/O 946 as well as storage for the databases. Together servers 110 and 120 may execute the computer program instructions to provide the automated ordering system 900 with CFI determination and order item recommendation as described herein.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "logic," "module," "mechanism" or "component" as used herein generally represents software, hardware, or a combination of software and hardware that can be configured to implement prescribed functions. For instance, in the case of a software implementation, the term "module," "mechanism," "logic" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A server comprising:
   one or more processors; and
   one or more non-transitory computer readable storage media to store instructions executable by the one or more processors to perform operations comprising:
      receiving, by an automated voice ordering system executing on the server, speech comprising order data from a device associated with a customer;
      performing natural language processing of the speech to identify one or more product items from a menu of menu items;
      adding the one or more product items to an order;
      determining, using a machine learning model, one or more suggested product items based on:
         a complementarity coefficient of the one or more suggested product items to the one or more product items, the complementarity coefficient comprising one of a symmetrical complementary coefficient, a kappa coefficient, a mean-square error, or a coefficient based on analysis by a sequential forward selection (SFS) algorithm;
         a similarity coefficient of the one or more suggested product items to the one or more product items, the similarity coefficient comprising one of a Jaccard index, a simple matching coefficient, a Hamming distance, a Sorensen-Dice coefficient, a Tversky index, or a Tanimoto distance; or
         any combination thereof;
      providing the one or more suggested product items to the device;
      receiving, from the device, additional speech identifying at least one product selection from the one or more suggested product items;
      adding the at least one product selection to the order;
      receiving, from the device, payment data to pay for the order; and
      initiating fulfillment of the order.

2. The server of claim 1, further comprising:
   determining, using a machine learning classifier, a customer identifier associated with the customer based at least in part on the order data.

3. The server of claim 1, wherein the machine learning model is trained to: recognize a colloquial term associated with an individual menu item of the menu items; recognize a regional name associated with the individual menu item; recognize a customer abbreviation associated with the individual menu item; or any combination thereof.

4. The server of claim 1, further comprising:
   mapping the customer to a persona model having similar food preferences.

5. The server of claim 1, wherein the natural language processing includes a voice parsing component.

6. The server of claim 1, further comprising determining a customer identifier associated with the customer using a classifier.

7. The server of claim 1, wherein providing the one or more suggested product items to the device comprises generating, using a text-to-speech generator, dialogue that includes the one or more suggested product items.

8. A method, comprising:
   receiving, by an automated voice ordering system executing on a server, speech comprising order data from a device associated with a customer;
   performing natural language processing of the speech to identify one or more product items from a menu of menu items;
   adding the one or more product items to an order;
   determining, using a machine learning model, one or more suggested product items based on:
      a complementarity coefficient of the one or more suggested product items to the one or more product items, the complementarity coefficient comprising one of a symmetrical complementary coefficient, a kappa coefficient, a mean-square error, or a coefficient based on analysis by a sequential forward selection (SFS) algorithm;
      a similarity coefficient of the one or more suggested product items to the one or more product items, the similarity coefficient comprising one of a Jaccard index, a simple matching coefficient, a Hamming distance, a Sorensen-Dice coefficient, a Tversky index, or a Tanimoto distance; or
   any combination thereof;
   providing the one or more suggested product items to the device;
   receiving, from the device, additional speech identifying at least one product selection from the one or more suggested product items;
   adding the at least one product selection to the order;
   receiving, from the device, payment data to pay for the order; and
   initiating fulfillment of the order.

9. The method of claim 8, further comprising:
   determining, using a machine learning classifier, a customer identifier associated with the customer based at least in part on the order data.

10. The method of claim 8, wherein the machine learning model is trained to: recognize a colloquial term associated with an individual menu item of the menu items; recognize a regional name associated with the individual menu item; recognize a customer abbreviation associated with the individual menu item; or any combination thereof.

11. The method of claim 8, further comprising:
    mapping the customer to a persona model having similar food preferences.

12. The method of claim 8, wherein the natural language processing includes a voice parsing component.

13. The method of claim 8, further comprising determining a customer identifier associated with the customer using a classifier.

14. The method of claim 8, wherein providing the one or more suggested product items to the device comprises generating, using a text-to-speech generator, dialogue that includes the one or more suggested product items.

15. A non-transitory computer readable storage media storing instructions executable by one or more processors to perform operations comprising:
    receiving, by an automated voice ordering system, speech comprising order data from a device associated with a customer;

performing natural language processing of the speech to identify one or more product items from a menu of menu items;

adding the one or more product items to an order;

determining, using a machine learning model, one or more suggested product items based on:
- a complementarity coefficient of the one or more suggested product items to the one or more product items, the complementarity coefficient comprising one of a symmetrical complementary coefficient, a kappa coefficient, a mean-square error, or a coefficient based on analysis by a sequential forward selection (SFS) algorithm;
- a similarity coefficient of the one or more suggested product items to the one or more product items, the similarity coefficient comprising one of a Jaccard index, a simple matching coefficient, a Hamming distance, a Sorensen-Dice coefficient, a Tversky index, or a Tanimoto distance; or
- any combination thereof;

providing the one or more suggested product items to the device;

receiving, from the device, additional speech identifying at least one product selection from the one or more suggested product items;

adding the at least one product selection to the order;

receiving, from the device, payment data to pay for the order; and initiating fulfillment of the order.

16. The non-transitory computer readable storage media of claim 15, further comprising:
determining, using a machine learning classifier, a customer identifier associated with the customer based at least in part on the order data.

17. The non-transitory computer readable storage media of claim 15, wherein the machine learning model is trained to: recognize a colloquial term associated with an individual menu item of the menu items; recognize a regional name associated with the individual menu item; recognize a customer abbreviation associated with the individual menu item; or any combination thereof.

18. The non-transitory computer readable storage media of claim 15, further comprising:
mapping the customer to a persona model having similar food preferences.

19. The non-transitory computer readable storage media of claim 15, wherein the natural language processing includes a voice parsing component.

20. The non-transitory computer readable storage media of claim 15, further comprising determining, using a machine learning classifier, a customer identifier associated with the customer.

* * * * *